(12) United States Patent
Joly et al.

(10) Patent No.: US 8,574,648 B2
(45) Date of Patent: Nov. 5, 2013

(54) METHOD AND APPARATUS FOR SMOKING FOOD PRODUCTS

(75) Inventors: Ghislaine M. Joly, Richland, WA (US); Michael S. Leitner, Richland, WA (US); Deborah Dihel, Richland, WA (US); William J. Pack, Touchet, WA (US)

(73) Assignee: ConAgra Foods Lamb Weston, Inc., Omaha, NE (US)

( * ) Notice: Subject to any disclaimer, the term of this patent is extended or adjusted under 35 U.S.C. 154(b) by 486 days.

(21) Appl. No.: 12/814,296

(22) Filed: Jun. 11, 2010

(65) Prior Publication Data

US 2010/0316777 A1 Dec. 16, 2010

Related U.S. Application Data

(60) Provisional application No. 61/268,509, filed on Jun. 11, 2009.

(51) Int. Cl.
*A23B 4/044* (2006.01)

(52) U.S. Cl.
USPC .......................................... 426/231; 426/314

(58) Field of Classification Search
CPC ................................ A23B 4/004; A23B 4/044
USPC ......... 426/231, 233, 235, 314, 465, 466, 469, 426/478–481
See application file for complete search history.

(56) References Cited

U.S. PATENT DOCUMENTS

| | | | | |
|---|---|---|---|---|
| 3,721,177 | A | * | 3/1973 | Booker ........................... 99/331 |
| 4,303,452 | A | | 12/1981 | Ohira et al. |
| 4,351,850 | A | | 9/1982 | Costamagna et al. |
| 4,767,629 | A | * | 8/1988 | Iglesias et al. .................. 426/55 |
| 5,609,902 | A | | 3/1997 | Inakuma et al. |
| 6,099,882 | A | | 8/2000 | Risner, Jr. et al. |
| 6,131,559 | A | | 10/2000 | Norris et al. |
| 6,548,100 | B1 | | 4/2003 | Bauer et al. |
| 6,723,364 | B1 | | 4/2004 | Bompeix et al. |
| 6,787,174 | B2 | | 9/2004 | Tanabe et al. |
| 7,438,943 | B2 | | 10/2008 | Khairullah et al. |
| 7,455,866 | B2 | | 11/2008 | Bodor et al. |

OTHER PUBLICATIONS

International Search Report from PCT Application No. PCT/US2010/38394, dated Aug. 25, 2010.
Written Opinion of the International Searching Authority from PCT Application No. PCT/US2010/38394, dated Aug. 25, 2010.

* cited by examiner

*Primary Examiner* — Steven Leff
(74) *Attorney, Agent, or Firm* — Advent LLP; Ryan T. Grace

(57) ABSTRACT

A method and apparatus for smoking food products includes a method or apparatus configured to provide a pH level of a smoked food product. The determination of the pH level of the smoked product provides an objective measure of the amount of smoke received by the food product, as well as an indication of the agreeability of the flavor of the food product. Based on the determination of the pH level, the method and apparatus can be adjusted to provide a more consistent, high quality smoked food product.

19 Claims, 7 Drawing Sheets

METHOD AND APPARATUS FOR SMOKING FOOD PRODUCTS

CROSS REFERENCE TO RELATED APPLICATION

This application claims the benefit of and priority to U.S. Provisional Application No. 61/268,509 filed Jun. 11, 2009, which is incorporated herein in its entirety.

FIELD

The disclosure of this application is directed to systems and methods of smoking food products to enhance or improve flavor.

BACKGROUND

Smoking is the process of flavoring or cooking food by exposing it to smoke generated from burning natural wood products. Smoke can enhance the flavor of certain food products, including, for example, meats, fish, vegetables, and cheeses. When smoking food products, however, it is difficult to objectively determine how much smoke flavor has been added. If too little smoke is added, the food does not obtain the smoky quality desired. On the other, if too much smoke is added, the food can be unpleasant to consume. This delicate balance of smoke flavor is made all the more difficult since individuals who are exposed to smoky conditions quickly become desensitized to the taste and smells that smoke imparts to food. Thus, a person involved in the smoking of the food product is often unable to provide a helpful assessment of the amount of smoke flavor that has been added to the food product.

Artificial or natural smoke flavors also have been developed. Although adding flavors has an advantage in that the amount of the ingredient added to the food product can be relatively easily controlled, they often do not produce a flavor or aroma that is as desirable as that produced by actually exposing a food product to a volume of natural smoke. Accordingly, it is desirable to provide an objective method to determine whether an appropriate amount of natural smoke flavor has been added to a food product.

SUMMARY

Methods and apparatuses are provided for making objective determinations of the amount of smoke flavor received by a smoked food product. These objective determinations provide a useful measure of the quality and consistency of smoked food products.

In one embodiment, a method of smoking food products includes providing a food product for smoking, determining a desirable range of pH levels of the food product after it has been smoked, and smoking the food product in a smoking area until it reaches a pH level that is in the desirable range of pH levels. In a specific implementation, the product is periodically sampled after it has been smoked to determine whether the smoked food product is in the desirable range of pH levels. In another specific implementation, after determining that the smoked food product has a pH level that falls outside of the desired range of pH levels, the smoking step is adjusted to increase or decrease the amount of smoke received by the food product during the act of smoking the food product.

In another specific implementation, the act of adjusting the smoking step comprises increasing or decreasing a residence time of the food product in the smoking area. The act of smoking the food product can include providing one or more conveyors for delivering the food product to the smoking area, and continuously moving the product through the smoking area on the conveyors. In another specific implementation, the act of adjusting the residence time can include reducing or increasing a speed of the conveyors. The act of adjusting the smoking step can also comprise increasing or decreasing the amount of smoke in the smoking area.

In another specific implementation, the act of smoking the food product can include misting the food product such as onions with water while it is in the smoking area, or controlling the wet bulb temperature to subject the product to a more humid environment. The onions can be further processed. For example, the method can include battering the onions after they exit the smoking area. In another specific implementation, the food product can be potatoes. The act of smoking the potatoes can serve to at least partially blanch and dry the potatoes.

In another embodiment, an apparatus for smoking food products can be provided. The apparatus can include a smoke generator for generating smoke, a smoking area for at least partially containing the smoke generated by the smoke generator, and a pH testing apparatus for measuring a pH level of a food product after it has been smoked in the smoking area. The apparatus can also include one or more conveyors for moving the food product into and out of the smoking area for smoking.

In a specific implementation, the apparatus can include a feedback device configured to adjust a parameter of the apparatus to increase or decrease the amount of smoke received by the food product in the smoking area based on the measured level of pH of the food product. The feedback device can be computer controlled. The feedback device can be configured to increase or decrease a speed of the conveyors to decrease or increase a residence time of the food product in the smoking area. In other specific implementations, the feedback device can be configured to increase or decrease the amount of smoke in the smoking area. Alternatively, or in addition, the feedback device can be configured to increase or decrease a temperature in the smoking area. In specific implementations, the food product can be onions, potatoes or other vegetables.

In another embodiment, an apparatus for smoking onions is provided. The apparatus comprises a housing having a smoking area and a smoke generator configured to produce smoke within the smoking area. An infeed conveyor can be configured to deliver a food product into the smoking area and an outfeed conveyor can be configured to deliver the food product out of the smoking area. The apparatus can also include a pH testing device for testing the pH of a first food product after it has been exposed to the smoke in the smoking area and a pH adjusting means to adjust the pH of a second food product based on a result of a pH test performed on the first food product.

In some implementations, the pH testing device can have a blending system that is configured to blend the first food product with an amount of water until it is substantially homogenous prior to testing the pH of the first food product. In other implementations, the apparatus can include an internal conveyor and the pH adjusting means can comprise a device for adjusting the speed of the internal conveyor to lengthen or shorten a residence time of the food product in the smoking area based on the result of the pH test performed on the first food product. The internal conveyor can comprise a plurality of vertically stacked conveyors and the food product can be tossed as it moves from a first vertically stacked conveyor to a second vertically stacked conveyor.

In other implementations, the pH adjusting means can comprise a device for adjusting the smoke generator to increase or decrease the amount of smoke in the smoking area based on the result of the pH test performed on the first food product. The adjusting means can be configured to adjust the pH by decreasing an exposure of the second food product to the smoke in the smoking area if the pH of the first food product is below about 4.36. In other embodiments, a moisture device can be positioned within the smoking area and configured to spray droplets of water onto a surface of the food product.

The foregoing and other objects, features, and advantages of the embodiments disclosed herein will become more apparent from the following detailed description, which proceeds with reference to the accompanying figures.

DETAILED DESCRIPTION

The following description is exemplary in nature and is not intended to limit the scope, applicability, or configuration of the invention in any way. Various changes to the described embodiment may be made in the function and arrangement of the elements described herein without departing from the scope of the invention.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

The apparatuses and methods described below can be utilized with a variety of foods products. The embodiments described below primarily focus on the smoking of onion products; however, it should be understood that the same apparatuses and methods could be used to smoke other food products including, for example, potatoes, sweet potatoes, red bell peppers, asparagus, and green beans. Of course, the specifics of the smoking procedure (e.g., smoking times, temperatures) may vary somewhat because of the physical differences between the various food products. While some of these differences (and resulting variations in the smoking procedures) are discussed in more detail below, other differences are not discussed in any particular detail since those would be obvious to one of ordinary skill in the art.

Figure 1:
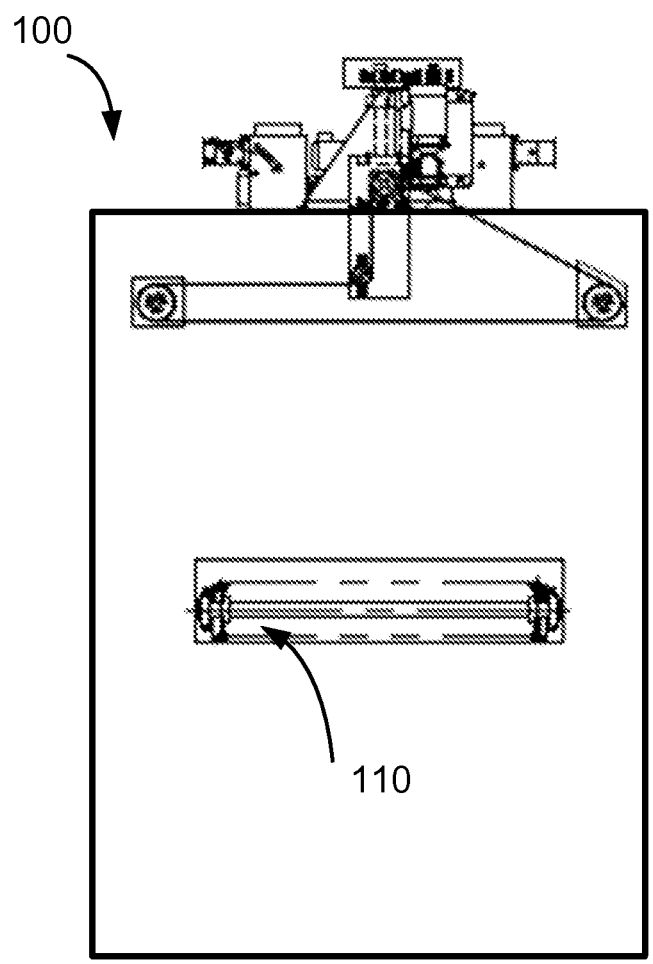
FIG. 1 is a left side view of an apparatus for smoking food products.
Figure 2:
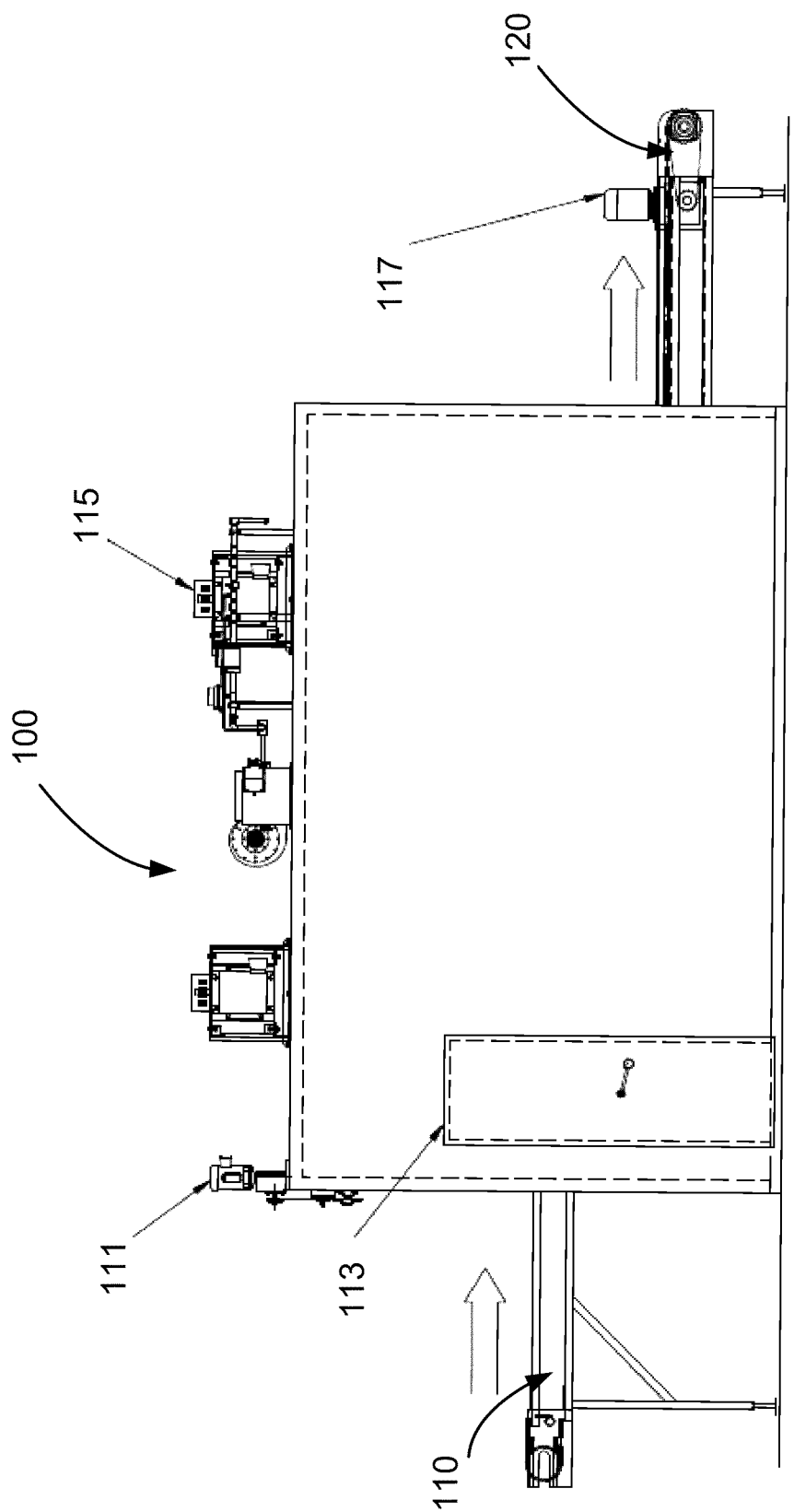
FIG. 2 is a front side view of an apparatus for smoking food products.
Figure 3:
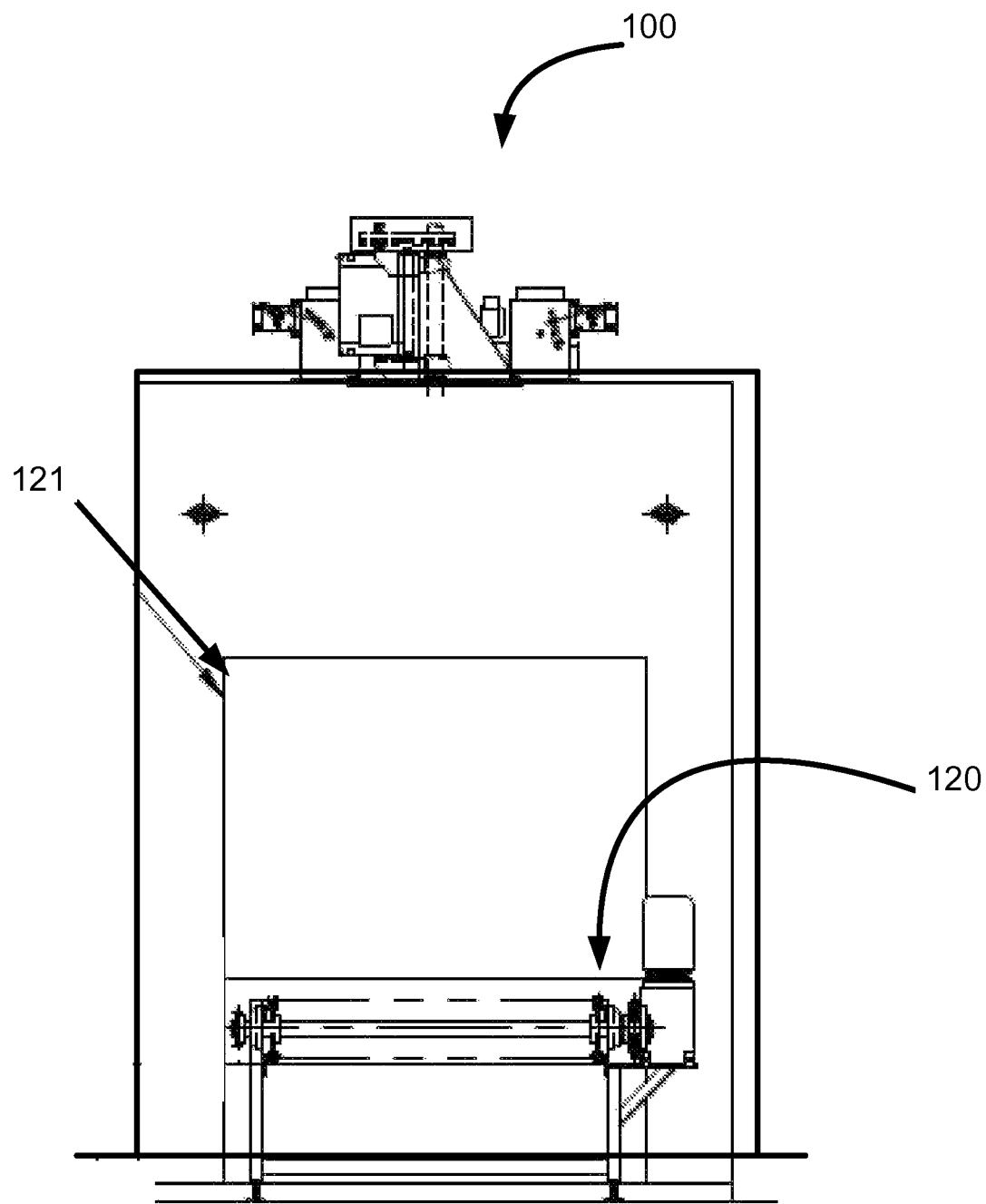
FIG. 3 is a right side view of an apparatus for smoking food products.

FIGS. 1-3 illustrate various views of an apparatus configured to impart natural smoke flavors to food products. The apparatus 100 includes an infeed member (conveyor) 110 and an outfeed member (conveyor) 120. The infeed conveyor 110 receives food product and delivers it into a smoking area 130. Smoking area 130 is at least partially enclosed to hold or contain the smoke during the smoking process. After the product has been maintained in the smoking area 130 for a sufficient amount of time to achieve the desired smoke flavor (and desired pH level as discussed in more detail below), the product exits from the smoking area 130 on the outfeed member 120. Infeed conveyor 110 and outfeed conveyor 120 can be any conveying means capable of moving product from one location to another including, for example, a conveyor belt. Preferably, the surface of the conveyors are perforated (e.g., a mesh conveyor belt) so that more surface area of the product can be exposed to the smoke when the product is in the smoking area 130.

FIGS. 1-3, and other figures discussed herein, include various dimensional specifications. For example, the smoking area 130 is identified as being approximately 16 feet long and about 10 feet high. It should be understood, however, that these dimensions are exemplary only. Depending on the amount and type of product to be smoked, the smoking area and related devices can be larger or smaller in size.

Figure 4:
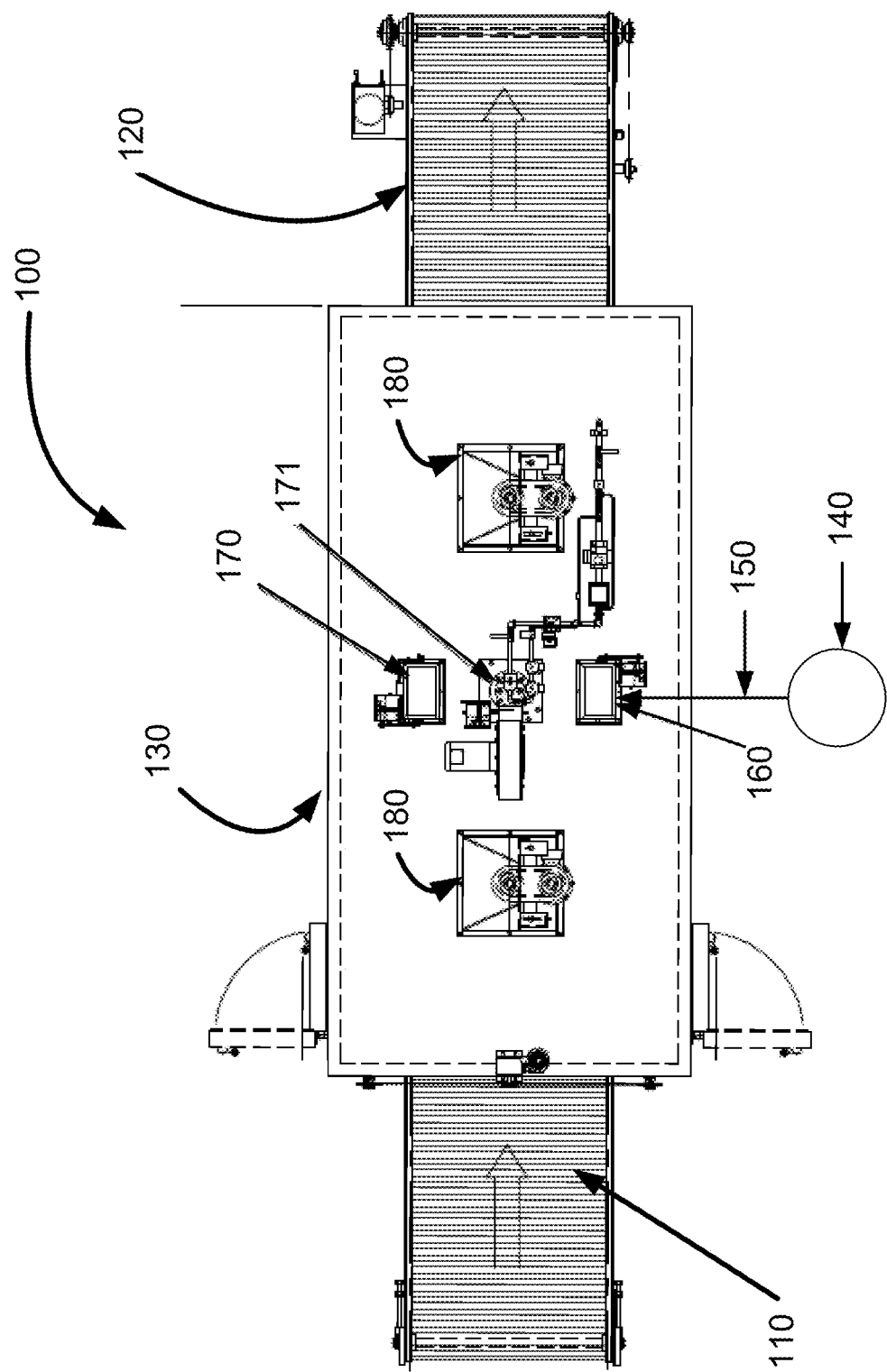
FIG. 4 is a top view of an apparatus for smoking food products.
Figure 6:
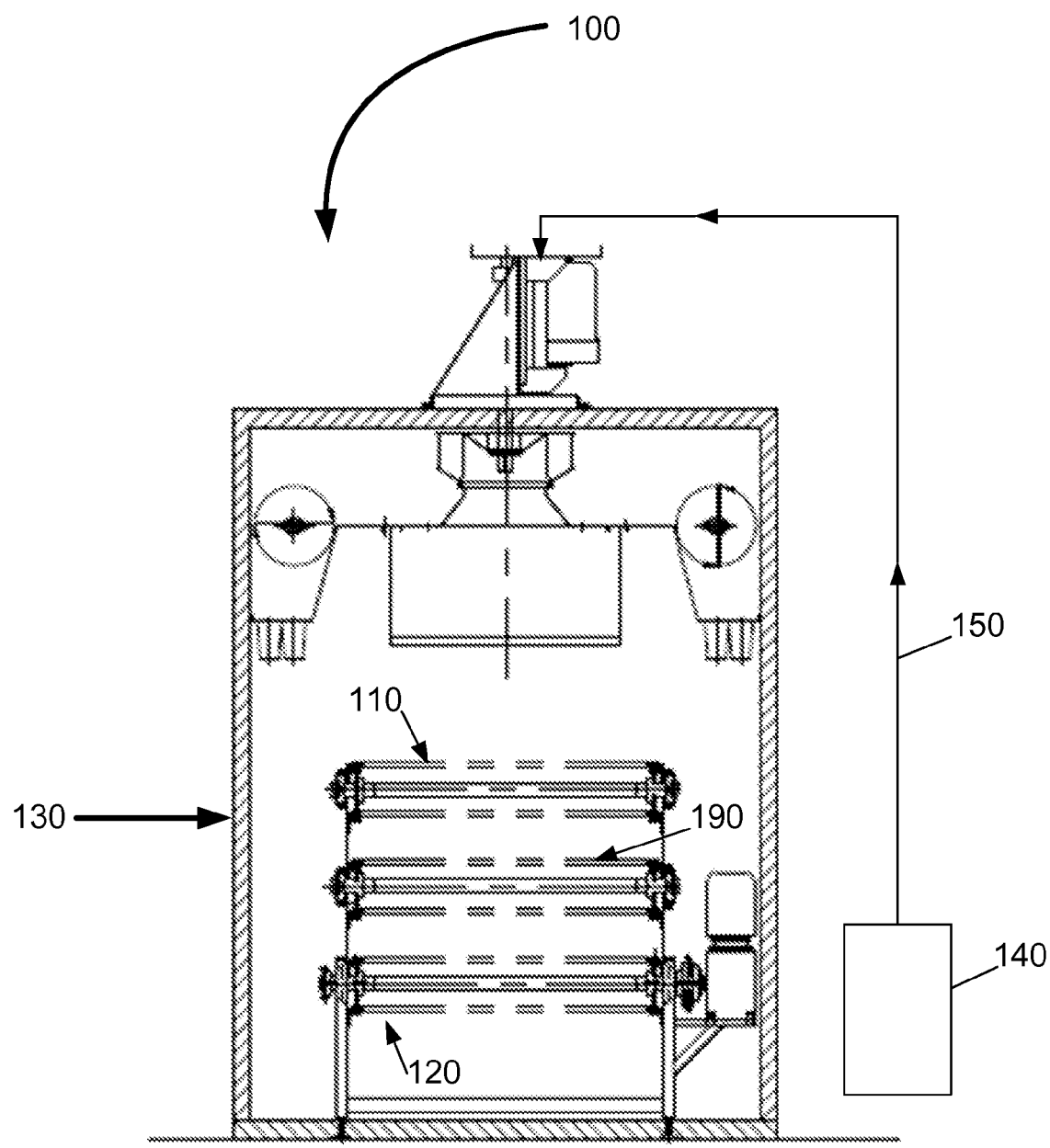
FIG. 6 is a cross-sectional side view of an apparatus for smoking food products.

Referring to FIGS. 4 and 6, a smoke generator 140 can be used to generate smoke that is delivered (e.g., piped) into the smoking area 130 via pipes, tubing, or conduits 150. Smoke generator 140 is shown outside of the smoking area 130; however smoke generator 140 could be located within the smoking area 130 if desired. Smoke generator 140 can comprise a heat source and a wood-receiving area adjacent the heat source. Wood is placed in the wood-receiving area and burned (or smoldered) to produce smoke for delivery into the smoking area 130. The wood that is burned can vary depending on the desired smoke flavor. For example, the wood can be sourced from any known tree source, including alder, oak, mesquite, hickory, maple, or apple trees. Typically, the wood is cut into chips and soaked in water for a few hours before it is delivered to the smoke generator. Alternatively, the chips may be sprayed or contacted with water just before entering the smoker, or delivered to the smoker without pretreatment.

The smoking area 130 can have one or more fresh air intake members 160 and one or more exhaust members 170. The smoke can be piped into the smoking area 130 through the fresh air intake members and/or other openings or ports in the smoking area 130. The amount of smoke contained in the smoking area 130 at any one time can be controlled by varying the amount of smoke delivered to the smoking area 130 from the smoke generator 140 and/or varying the amount of intake and exhaust air. In addition, to ensure movement of smoke within the smoking area 130, one or more blowers (fans) 180 can be provided to circulate smoke within the smoking area 130 to achieve more uniform smoke distribution and/or increase smoke pick-up by the product in the smoking area 130.

Figure 5:
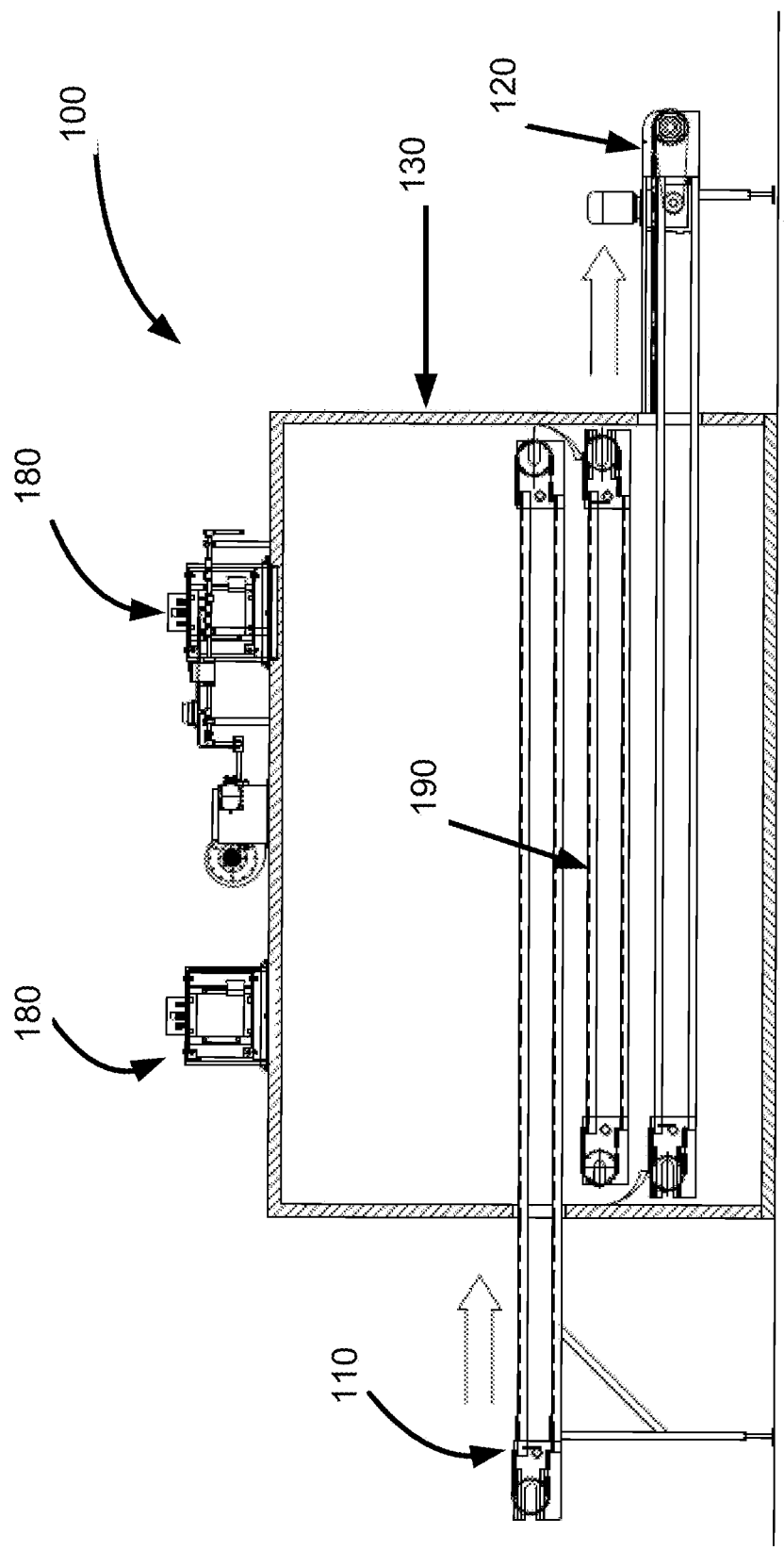
FIG. 5 is a cross-sectional front view an apparatus for smoking food products.

The apparatus can comprise a simple "box" smoker where product moves into the box and is smoked, and then moves out of the box for further processing. However, the apparatus 100 more preferably is a continuous smoker which permits the product to continually move through the smoking area while picking up smoke flavor. For example, as shown in FIGS. 5 and 6, the product enters the smoking area 130 on the infeed conveyor 110, and then is passed to one or more intermediate conveyors 190. The intermediate conveyors 190 increase the time (residence) of the product in the smoker by increasing the length of travel of the product on the conveying members (110, 120, 190). The intermediate conveyors and resulting reorientation of the product during transfer from one conveyor to the next facilitates more uniform and effective smoke exposure to all sides of the product. In addition, the speed of the conveyors can be adjusted to alter residence time in the smoking area. Thus, by speeding up the conveyors, the product moves through the smoking area more quickly, reducing residence time in the smoking area. Alternatively, reducing the speed of the conveyors decreases the amount of time the product spends in the smoking area.

The dry-bulb and wet-bulb temperatures in the apparatus can be adjusted to alter the amount of smoke delivered to the product and to ensure that the product is not cooked (or over-cooked) during smoking. Depending on the product and the residence time of the product in the smoking area, the dry-bulb temperature can be in the range of about 145-200° F. (more preferably about 180° F.) and the wet-bulb temperature can be in the range of about 110-160° F. (more preferably about 130° F.).

Figure 7:
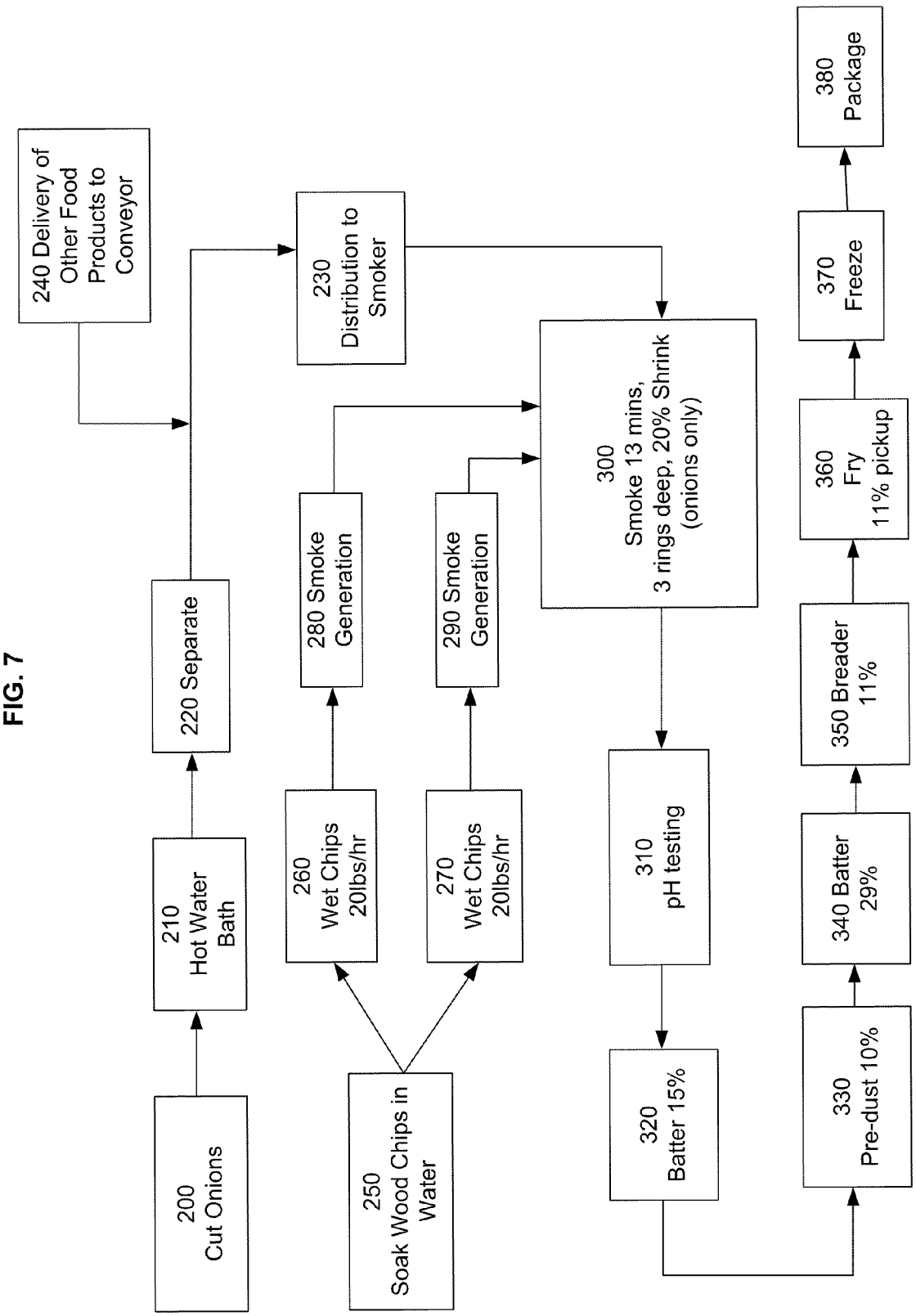
FIG. 7 is a flow chart illustrating a method of smoking food products.

FIG. 7 illustrates a method for smoking onions (or other food products) in a smoking apparatus, such as the smoking apparatus described above. The method can include Step 200, which is cutting onions. The onions can be cut into any shape and/or size. For example, the cut onion pieces can be in the form of strips, petals, rings, and/or diced. The cut onions are preferably then placed into a water bath (Step 210) to help separate (Step 220) any undesirable skin or membranes from the onions. The water bath preferably is at a temperature of about 80-160° F. The onions are then removed from the water and placed on a conveyor for distribution to the smoking area (Step 230). As shown in FIG. 7 in Step 240, other food products besides onions can be prepared and delivered to a conveyor for distribution to the smoking area.

The wood that is to be smoked can be soaked in water (Step 250) for a time. Preferably, the wood is soaked long enough (e.g., about 3 hours) to pick up an acceptable amount of water. For example, after about 3 hours, the water pick up of the chips by weight is about 15-20%. The pre-soaked wood chips can then be delivered to one or more smoke generators (Steps 260, 270). The wood chips are burned (smoldered) to create smoke (Steps 280, 290). Smoke from the smoke generators is delivered to the smoking area. Once the smoking area has an appropriate amount of smoke, the product can be delivered into the smoking area. The smoking Step 300 can vary depending on the product, the amount of smoke, and the smoking area in question. In one embodiment, onions are cut, delivered to the smoking area on a conveyor that carried the cut onions at about 3 rings deep. In one example, the residence time of the onions in the smoking area may be about 13 minutes. The onions experienced about a 20% weight loss due to water loss associated with the elevated temperatures and air flow in the smoking area.

After the onions leave the smoker (e.g., on the outfeed conveyor), the onions can be battered and fried as described below. Prior to any subsequent processing, however, it is desirable to perform pH testing of one or more samples of the smoked product to determine whether the product has received an appropriate amount of smoke. It has been determined that the smoking process (such as that described above) is acidic and, as a result, smoking reduces the pH level of a food product. In addition, it has been found that there is a direct correlation of the resulting pH level of the smoked product and the desirability of the smoked flavor of the product.

Using onions as an example, the pH of a raw yellow onion can be about 5.4-5.8. However, during smoking the pH of the onion can drop significantly. The pH level of the smoked product was found to directly correspond to the amount of smoke flavor added and the desirability of the taste of the smoked product. For example, it was found that, for one particular type of yellow onions, a pH of about 4.36 was most desirable. At pH levels above 4.36, for example at a pH of about 4.46, it was found that there was not enough smoke flavor received by the product and at pH levels below 4.36, for example at a pH of about 4.29, the flavor of the product was too smoky or otherwise undesirable.

Accordingly, using a predetermined measure of pH as a quality indicator, it is possible to determine an effective smoking process for a product. For example, after making an initial determination about the final desired pH for the smoked product, the appropriate residence time in the smoking area, amount of smoke added to the smoking area, wet and dry temperatures, etc. can be established. As the smoking process is performed, smoked product can be periodically checked to determine whether the pH of the smoked product is in the desired range. If not, various adjustments can be made to the process to either reduce or raise the resulting pH levels of the smoked product to achieve a more consistent and flavorful smoked product. For example, if it is determined that the smoked product has a pH level that is below the desired range of pH, the speed of the conveying members could be increased to reduce the amount of time the product spends in the smoking area. Alternatively, if it is determined that the smoked product has a pH level that is above the desired range of pH, the speed of the conveying members could be decreased to reduce the amount of time the product spends in the smoking area.

Such adjustments could include a change of any of the other factors described herein that increase or decrease the amount of smoke added to a raw product. For example, it may be desirable to increase (or decrease) the amount of smoke in the smoking area to increase (or decrease) the amount of smoke flavor imparted to the product while it is in the smoking area. The amount of smoke added to the smoking area can be adjusted by changing the amount of smoke piped into the smoking area or by venting smoke that is already in the smoking area. Measurements of the amount of smoke in the smoking area can be taken using a laser or other tool to measure the opacity of the air in the smoking area. Preferably, this measurement is taken near the surface of one or more of the conveyors so that the measurement reflects the amount of smoke that the product is encountering as it moves through the smoking area.

Thus, an objective measurement of the quantity of smoke received by the product can be achieved by measuring pH after smoking. This objective measurement is especially useful because individuals involved in smoking processes quickly become accustomed to the smoke and, after a short time, have difficulty providing a useful subjective measurement of smoke flavor based on, for example, taste or aroma of the smoked product. Depending on the smoking process, the product being processed, and the volumes of product being processed, pH measurements could be taken at any reasonable interval. For example, samples could be collected and measured every 15 minutes, every 30 minutes, 60 minutes, 120 minutes, etc. after the onions exit the smoking area.

Of course, it should be understood that the pH levels discussed above for a single type of yellow onion are not absolute levels of quality that are necessarily applicable to other products. Different products will likely have different preferred pH levels after smoking. The optimal pH levels of other types of food products can be determined by taste testing various smoked products to establish an optimum smoked flavor and then determining the pH of those optimal products. Even different types of onion may experience some variation in starting and/or desired ending pH levels. However, once the desired pH level for a particular product has been determined, the smoking process can be configured to deliver a smoked product that has a pH in the desired range.

The pH of smoked product can be tested in various manners. In one embodiment, the smoked product can be combined with water, ground up in a blender until the mixture is substantially homogenous, and measured using conventional pH measuring tools. Of course, different products may require different amounts of water. Onions, for example, have a higher natural water content than potatoes and, therefore, it may not be necessary to add as much water to an onion during pH testing.

Preferably, the process for measuring the pH of food product after smoking is automated and includes a feedback device that is configured to adjust one or more variables of the smoking process. For example, upon receiving the results of a pH test, a computer controlled feedback device can vary one or more of the parameters that affect smoke pickup by a product, including, for example, the speed of the conveyors, the amount of smoke entering the smoking area, and the temperatures (wet-bulb and/or dry-bulb) of the smoking area.

Referring again to FIG. 7, after smoking the onions, the product can be conveyed to downstream stations for further processing. For example, onion products can be battered (Step 320), pre-dusted (Step 330), battered again for additional batter pickup (Step 340), breaded (Step 350), fried in oil (Step 360), frozen (Step 370) and packaged (Step 380). It is not always necessary to further process the smoked product. However, if further processing is required, the use of pH as a quality control check can reduce unnecessary processing of poorly smoked product. That is, by checking the pH prior to further processing of the smoked product (e.g., prior to battering, frying, etc.), it is possible to identify substandard product before expending the cost and time associated with each of the downstream processes.

Smoke pickup can be affected by the moisture in the smoking area. Accordingly, if desired, water can be misted or sprayed onto the product in the smoking area to increase smoke absorbency of the product. Preferably, the water mist or spray comprises small (fine) droplets of water. Wetting product in the smoking area can also decrease case hardening of the finished product. Alternatively, to increase the moisture level in the smoking area, steam can be injected into the apparatus. The injection of steam into the smoking area can be a particularly efficient way to increase moisture levels within the smoking area, since steam raises the temperature of the smoking area at the same time.

In addition, it may be desirable to "toss" or otherwise move product around within the smoking area so that additional smoke pickup can be achieved in a shorter residence time. Tossing product, especially when it is not in a single layer on a conveyor (or smoking platform), allows better smoke distribution and can help prevent uneven color distribution. This can be especially useful when smoking a stack of cut potatoes.

When smoking a product that traditionally requires a drying step, the smoking process can be used to serve this purpose as well. For example, conventional methods of processing French fries include placing the French fries in a dryer to remove moisture before coating and/or parfrying. When French fries are smoked in a smoking area as described herein, the smoking process can serve to reduce the moisture content of the product, thereby eliminating the need for a separate drying step.

The smoking process can also be used to replace a blanching process if desired. For example, potatoes are traditionally immersed in hot water or steam for a short time interval to partially cook them. Because of the heat involved in the smoking processes described herein, the smoking step can perform the function of a blanching step if steam, mist or other moisture exposure is incorporated into the smoking step. Thus, when cooking sweet potatoes, for example, the smoking processes described herein can blanch the potatoes, smoke the potatoes, and dry the potatoes.

ADDITIONAL EXAMPLES

Example 1

White flesh potatoes were peeled, preheated and cut into 3/8 inch straight cut strips. The strips were blanched in hot water containing 0.5% SAPP by weight at about 170° F. for about 14 minutes. The strips were conveyed on a bed 2.5 inches deep through the smoker. The smoker was set at 180° F. dry bulb temperature and medium fan setting. The smoker had no initial wet bulb temperature setting, although moisture given off by the strips during smoking added humidity to the smoking area. The strips resided in the smoker for 10 minutes and experienced a weight loss of about 14% by weight.

The smoked strips were immersed in a starch based, clear coat batter, picking up 12% batter by weight (wet base). The battered potato strips were parfried in oil at a temperature of 375° F. for 0.75 minutes, picking up 4% oil by weight. The parfried strips were frozen.

The frozen strips were reconstituted by frying in oil at a temperature of 360° F. for about 120 seconds. The final product exhibited a desirable smoky aroma and flavor. The product had a desirable golden brown appearance that was slightly darker than traditional French fried potatoes. The product exhibited a crisp surface texture and mealy potato interior typical of traditional French fried potatoes.

Example 2

Sweet potatoes were peeled and cut into 3/8 inch straight cut strips. The strips were blanched in hot water containing 0.25% by weight SAPP at about 190° F. for about 2 minutes. The strips were conveyed on a bed 2.5 inches deep through the smoker. The smoker was set at 180° F. dry bulb temperature, no initial setting for wet bulb temperature, and high fan speed.

The sweet potato strips resided in the smoker for about 10 minutes and experienced a 20% weight loss by weight.

The smoked strips were immersed in a starch-based clear coat batter, picking up 12% batter by weight (wet base). The battered strips were parfried in oil at a temperature of 375° F. for 45 seconds, picking up 4% oil by weight and frozen.

The frozen strips were reconstituted by frying in oil at a temperature of 360° F. for 120 seconds. The final product exhibited a smoky aroma and flavor. The product exhibited a slightly darker color than traditional sweet potato fries. The product also exhibited the texture and soft potato interior of typical sweet potato fries.

Example 3

Sweet potatoes were processed as in Example 2, except as otherwise provided herein. The strips were not blanched after cutting. The strips were smoked for 12.5 minutes at a dry bulb temperature of 210° F., wet bulb temperature of 160° F., and medium fan setting. The finished product when reconstituted was virtually indistinguishable from Example 2. The wet bulb setting helped compensate for the omitted blanching step to produce the desired texture in the final product.

Test data suggests that it is preferable to provide a wet bulb temperature for onions as they are smoked to facilitate smoke pick-up. Onions have membranes that tend to make onion cells less receptive to smoke absorption. Potato cells tend to be more open and potatoes are more porous once cut, and more receptive to smoke absorption in a drier environment. Test data also suggests that the smoking step can be used to not only add a smoke flavor to potatoes but as a substitute for separate blanching and/or drying steps.

Test data shows that 0.375 inch straight cut, skin-on Russet potatoes having an average starting pH of 6.07 and smoked under conditions and for a period of time sufficient to lower the average pH to 5.97 have a desirable and appealing smoky flavor. Test data also shows that ⅜ inch thick slices of zucchini having an average starting pH of 6.89 and smoked under conditions and for a period of time sufficient to lower the average pH to 5.52 have a desirable and appealing smoky flavor. Additional test data shows that whole green asparagus having a starting average pH of 6.58 and smoked under conditions and for a period of time sufficient to lower the average pH to 5.4 have a desirable and appealing smoky flavor.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of smoking food products comprising:
providing a food product for smoking;
determining a desirable range of pH levels for the food product to achieve as a result of smoking;
smoking the food product in a smoking apparatus;
testing the pH level of the food product after it has been smoked;
comparing the tested pH level to the desired range of pH levels;
in response to determining that the tested pH level falls outside of the desirable range of pH levels, adjusting at least one parameter of the smoking apparatus to increase or decrease the amount of smoke received by the food product, wherein the amount of smoke is detected by a laser configured to measure opacity of air in the smoking apparatus.

2. The method of claim 1, wherein adjusting at least one parameter of the smoking apparatus includes varying an amount of smoke delivered, via a smoke generator, to a smoking area of the smoking apparatus.

3. The method of claim 1, wherein adjusting at least one parameter of the smoking apparatus includes varying an air intake and an air exhaust.

4. The method of claim 1, wherein adjusting at least one parameter of the smoking apparatus includes varying a speed of a conveyer of the smoking apparatus.

5. The method of claim 1, wherein adjusting at least one parameter of the smoking apparatus includes varying the humidity within the smoking apparatus.

6. The method of claim 1, wherein the food product is onion, wherein the onion has an initial pH from about 5.4 to about 5.8, wherein the desirable range of pH levels for the onion to achieve as a result of smoking is from about 4.29 to about 4.46.

7. The method of claim 6, wherein the desirable range of pH levels for the onion to achieve as a result of smoking is about 4.36.

8. A method of smoking food products, the method comprising:
determining a desired smoke intensity level for a food product type, wherein the food product type is at least one member of a group consisting of: onion, potato, sweet potato, pepper, asparagus and green bean;
determining a desirable range of pH levels to be achieved as a result of smoking, wherein the desirable range corresponds to the desired smoke intensity level for the food product type;
conveying a product stream having the product type through a smoking apparatus;
testing the pH of the product stream after it has been smoked;
receiving a result of the testing on a computer controlled feedback device that is in communication with the smoking apparatus; and
in response to determining that the tested pH of the food product stream falls outside of the desirable range of pH levels, causing the computer controlled feedback device to vary at least one parameter of the smoking apparatus to increase or decrease the amount of smoke received by the food product stream, wherein the amount of smoke is detected by a laser configured to measure opacity of air in the smoking apparatus.

9. The method of claim 8, wherein causing the computer controlled feedback device to vary at least one parameter of the smoking apparatus includes causing the computer controlled feedback device to vary an amount of smoke delivered, via a smoke generator, to a smoking area of the smoking apparatus.

10. The method of claim 9, wherein causing the computer controlled feedback device to vary at least one parameter of the smoking apparatus includes causing the computer controlled feedback device to vary an air intake and an air exhaust.

11. The method of claim 8, wherein causing the computer controlled feedback device to vary at least one parameter of the smoking apparatus includes causing the computer controlled feedback device to vary a speed of a conveyer of the smoking apparatus.

12. The method of claim 8, wherein causing the computer controlled feedback device to vary at least one parameter of the smoking apparatus includes causing the computer controlled feedback device to vary the humidity within the smoking apparatus.

13. The method of claim 8, wherein the desirable range of pH levels to be achieved as a result of smoking is from about 4.29 to about 4.46.

14. The method of claim 13, wherein the desirable range of pH levels to be achieved as a result of smoking is about 4.36.

15. A method of smoking food products, the method comprising:

determining a desirable range of pH levels to be achieved as a result of smoking, wherein the desirable range corresponds to a desired smoke intensity level for a food product type;

testing a pH of a food product having the food product type after it has been smoked;

in response to determining that the tested pH of the food product falls within the desirable range of pH levels, causing a computer controlled feedback device to maintain at least one parameter of the smoking apparatus to maintain the amount of smoke received by the food product, wherein the amount of smoke is detected by a laser configured to measure opacity of air in the smoking apparatus.

16. The method of claim 15, wherein causing the computer controlled feedback device to maintain at least one parameter of the smoking apparatus includes causing the computer controlled feedback device to maintain an amount of smoke delivered, via a smoke generator, to a smoking area of the smoking apparatus.

17. The method of claim 15, wherein causing the computer controlled feedback device to maintain at least one parameter of the smoking apparatus includes causing the computer controlled feedback device to maintain a speed of a conveyer of the smoking apparatus.

18. The method of claim 15, wherein causing the computer controlled feedback device to maintain at least one parameter of the smoking apparatus includes causing the computer controlled feedback device to maintain the humidity within the smoking apparatus.

19. The method of claim 15, wherein the desirable range of pH levels to be achieved as a result of smoking is from about 4.29 to about 4.46.

* * * * *